(12) United States Patent
Oh et al.

(10) Patent No.: US 10,950,878 B2
(45) Date of Patent: Mar. 16, 2021

(54) HUMIDIFIER FOR A FUEL CELL

(71) Applicants: HYUNDAI MOTOR COMPANY, Seoul (KR); KIA MOTORS CORPORATION, Seoul (KR)

(72) Inventors: Sae Han Oh, Suwon-si (KR); Hyun Yoo Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 83 days.

(21) Appl. No.: 16/368,452

(22) Filed: Mar. 28, 2019

(65) Prior Publication Data
US 2020/0153004 A1 May 14, 2020

(30) Foreign Application Priority Data

Nov. 14, 2018 (KR) .................. 10-2018-0140290

(51) Int. Cl.
*H01M 8/04119* (2016.01)
*H01M 8/04746* (2016.01)
*H01M 8/04828* (2016.01)

(52) U.S. Cl.
CPC ... *H01M 8/04149* (2013.01); *H01M 8/04753* (2013.01); *H01M 8/04835* (2013.01)

(58) Field of Classification Search
CPC ......... H01M 8/04149; H01M 8/04753; H01M 8/04835
See application file for complete search history.

(56) References Cited

U.S. PATENT DOCUMENTS

| | | | |
|---|---|---|---|
| 6,238,817 B1 * | 5/2001 | Reiser ............... | H01M 8/04089 429/408 |
| 2016/0036073 A1 * | 2/2016 | Kim .................. | H01M 8/04291 429/414 |
| 2018/0166712 A1 * | 6/2018 | Park .................. | H01M 8/04395 |

* cited by examiner

*Primary Examiner* — Muhammad S Siddiquee
(74) *Attorney, Agent, or Firm* — Lempia Summerfield Katz LLC (57) ABSTRACT

A humidifier for a fuel cell includes a body, first and second humidifying spaces formed inside the body, an exhaust gas inlet and an exhaust gas outlet for supplying exhaust gas released from the fuel cell stack into the first and second humidifying spaces, a passing space formed inside the body and directly or indirectly communicated with the second humidifying space and the fuel cell stack. The inflow gas flows into the passing space from the first humidifying space. A valve is installed in the passing space to allow the inflow gas introduced into the passing space to flow into the fuel cell stack with or without passing through or to allow some of the inflow gas introduced into the passing space to flow into the fuel cell stack passing through the second humidifying space and others of the inflow gas introduced into the fuel cell stack without passing through the second humidifying space.

12 Claims, 7 Drawing Sheets

HUMIDIFIER FOR A FUEL CELL

CROSS-REFERENCE TO RELATED APPLICATION

This application claims the benefit of priority to Korean Patent Application No. 10-2018-0140290, filed in the Korean Intellectual Property Office on Nov. 14, 2018, the entire contents of which are incorporated herein by reference.

TECHNICAL FIELD

The present disclosure relates to a humidifier for a fuel cell, and more particularly, to a fuel cell humidifier for adjusting a flow path along which inflow gas flows in the humidifier.

BACKGROUND

Fuel cell systems, which continually produce electrical energy through an electro-chemical reaction of fuel continuously supplied thereto, have been consistently studied and developed as an alternative for solving global environmental problems.

The fuel cell systems may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), and a direct methanol fuel cell (DMFC) according to the types of electrolytes used. The fuel cell systems may be applied to various applications, such as mobile power supply, transportation, distributed power generation, and the like, according to operating temperatures and output ranges along with the types of fuels used.

Among the fuel cells mentioned above, the PEMFC is applied to a hydrogen vehicle (a hydrogen fueled cell vehicle) that is being developed to replace an internal combustion engine.

The hydrogen vehicle is driven by producing electricity through an electro-chemical reaction of hydrogen and oxygen and operating a motor with the electricity produced. The hydrogen vehicle has a structure that includes a hydrogen ($H_2$) tank for storing hydrogen ($H_2$), a fuel cell stack (FC stack) for producing electricity through oxidation/reduction reactions of hydrogen ($H_2$) and oxygen ($O_2$), various apparatuses for draining water produced, a battery for storing the electricity produced by the fuel cell stack, a controller for converting and controlling the electricity produced, a motor for generating a driving force, and the like.

The fuel cell stack refers to a fuel cell body having tens or hundreds of cells stacked one above another in series. The fuel cell stack has a structure in which a plurality of cells are stacked between end plates, each cell including an electrolyte membrane that divides the interior of the cell into two parts, an anode on one side of the electrolyte membrane and a cathode on the other side thereof.

A separator is disposed between the cells to restrict flow paths of hydrogen and oxygen. The separator is made of a conductor to move electrons during oxidation/reduction reactions.

When hydrogen is supplied to the anode, the hydrogen is divided into hydrogen ions and electrons by a catalyst. The electrons produce electricity while moving outside the fuel cell stack through the separator. The hydrogen ions pass through the electrolyte membrane and move to the cathode, after which the hydrogen ions are combined with oxygen supplied from ambient air and electrons to produce water. The water produced is discharged to the outside.

The PEMFC may maintain power generation efficiency only if an appropriate moisture content is maintained by supplying a predetermined amount of moisture to a polymer electrolyte membrane of a membrane-electrode assembly (MEA).

The fuel cell system may include a humidifier to humidify inflow gas flowing into the fuel cell stack.

The humidifier has to regulate the amount of added moisture according to the humidity inside the fuel cell stack because even if the inside of the fuel cell stack is very humid, the diffusion of the inflow gas may be reduced and therefore the power generation efficiency may be lowered.

To solve this problem, in a conventional fuel cell system, a bypass passage is formed to allow part of inflow gas to directly flow into a fuel cell stack except through a humidifier, and the rest of the inflow gas is humidified. However, in this case, the system is complicated.

SUMMARY

The present disclosure has been made to solve the above-mentioned problems occurring in the prior art while advantages achieved by the prior art are maintained intact.

An aspect of the present disclosure provides a fuel cell humidifier for appropriately regulating the amount of added moisture according to various operating conditions of a fuel cell stack.

Another aspect of the present disclosure provides a fuel cell humidifier for regulating the amount of added moisture by itself with a compact structure.

The technical problems to be solved by the present inventive concept are not limited to the aforementioned problems. Any other technical problems not mentioned herein will be clearly understood from the following description by those of ordinary skill in the art to which the present disclosure pertains.

According to an aspect of the present disclosure, a humidifier for a fuel cell includes a body, first and second humidifying spaces formed inside the body, wherein humidifying membranes through which inflow gas to be introduced into a fuel cell stack flows are installed in the first and second humidifying spaces. The humidifier further comprises an exhaust gas inlet and an exhaust gas outlet disposed at the body for supplying exhaust gas released from the fuel cell stack into the first and second humidifying spaces. The exhaust gas has higher humidity than the inflow gas. The humidifier also comprises a passing space formed inside the body and directly or indirectly communicated with the second humidifying space and the fuel cell stack, wherein the inflow gas flows into the passing space from the first humidifying space. The humidifier further comprises a first valve installed in the passing space to allow the inflow gas introduced into the passing space to flow into the fuel cell stack passing through the second humidifying space or the fuel cell stack without passing through the second humidifying space or to allow some of the inflow gas introduced into the passing space to flow into the fuel cell stack passing through the second humidifying space and others of the inflow gas introduced into the fuel cell stack without passing through the second humidifying space. A flow path of the inflow gas introduced into the body is changed by controlling the first valve.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, various embodiments of the present disclosure are described in detail with reference to the accompanying drawings. It should be understood that even if shown in different drawings, identical components are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. Furthermore, when the terms "first" and "second" are used, it does not mean that both the first and second components must exist, and only the first component may exist without the second component or only the second component may exist without the first component.

If a component were described as "connected", "coupled", or "linked" to another component, they may mean the components are not only directly "connected", "coupled", or "linked" but also are indirectly "connected", "coupled", or "linked" via a third component.

Figure 1A:
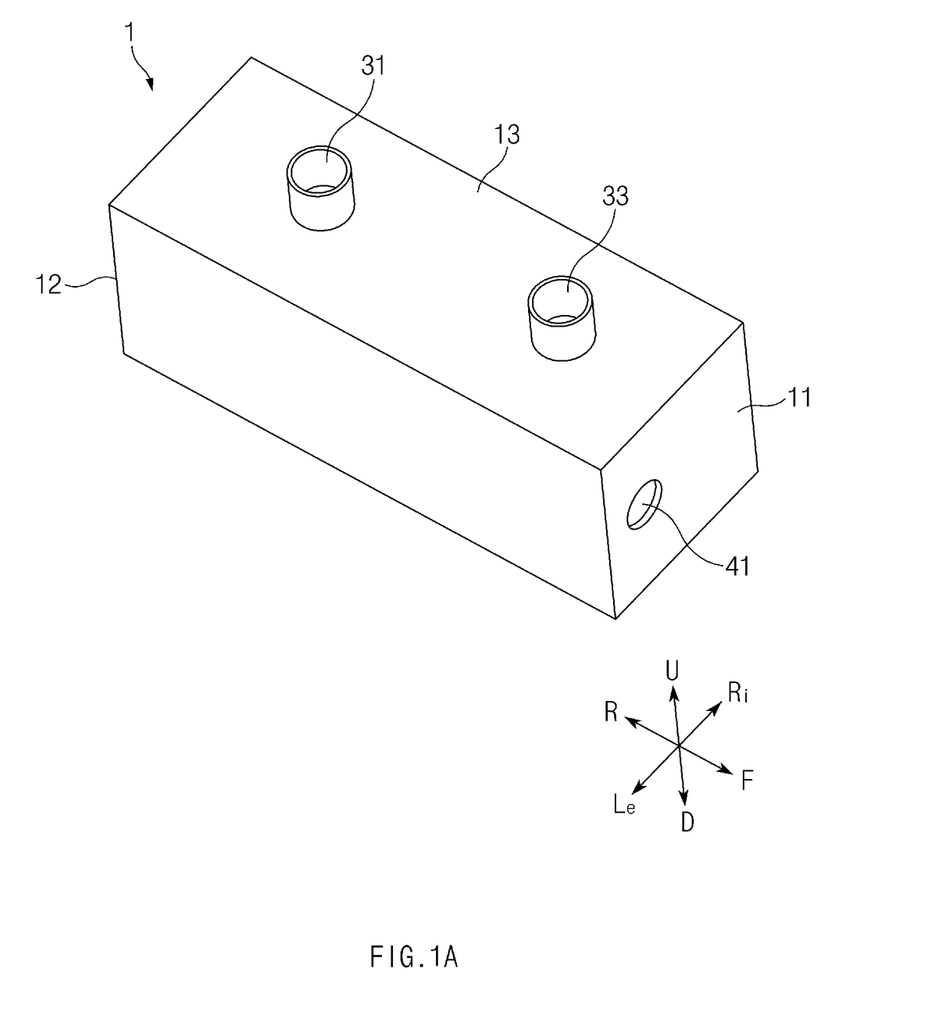
FIG. 1A is a perspective view illustrating a humidifier for a fuel cell according to an embodiment of the present disclosure.
Figure 1B:
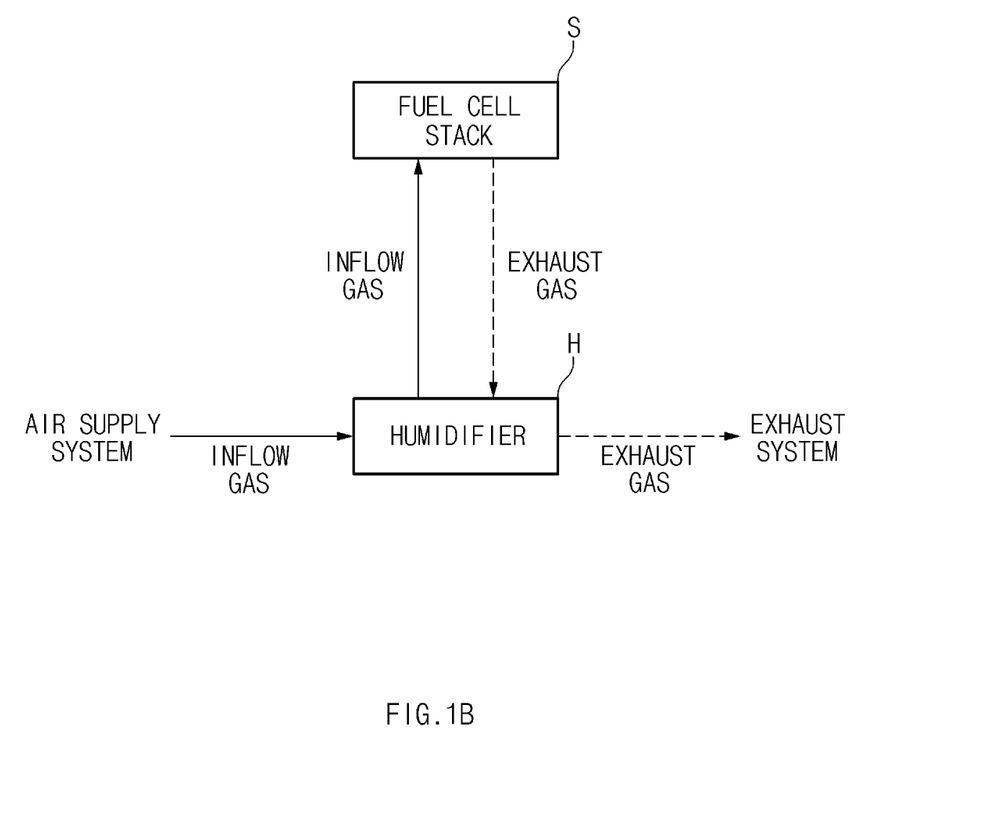
FIG. 1B is a block diagram illustrating the gas flow in the humidifier and the fuel cell stack of the present disclosure.
Figure 2:
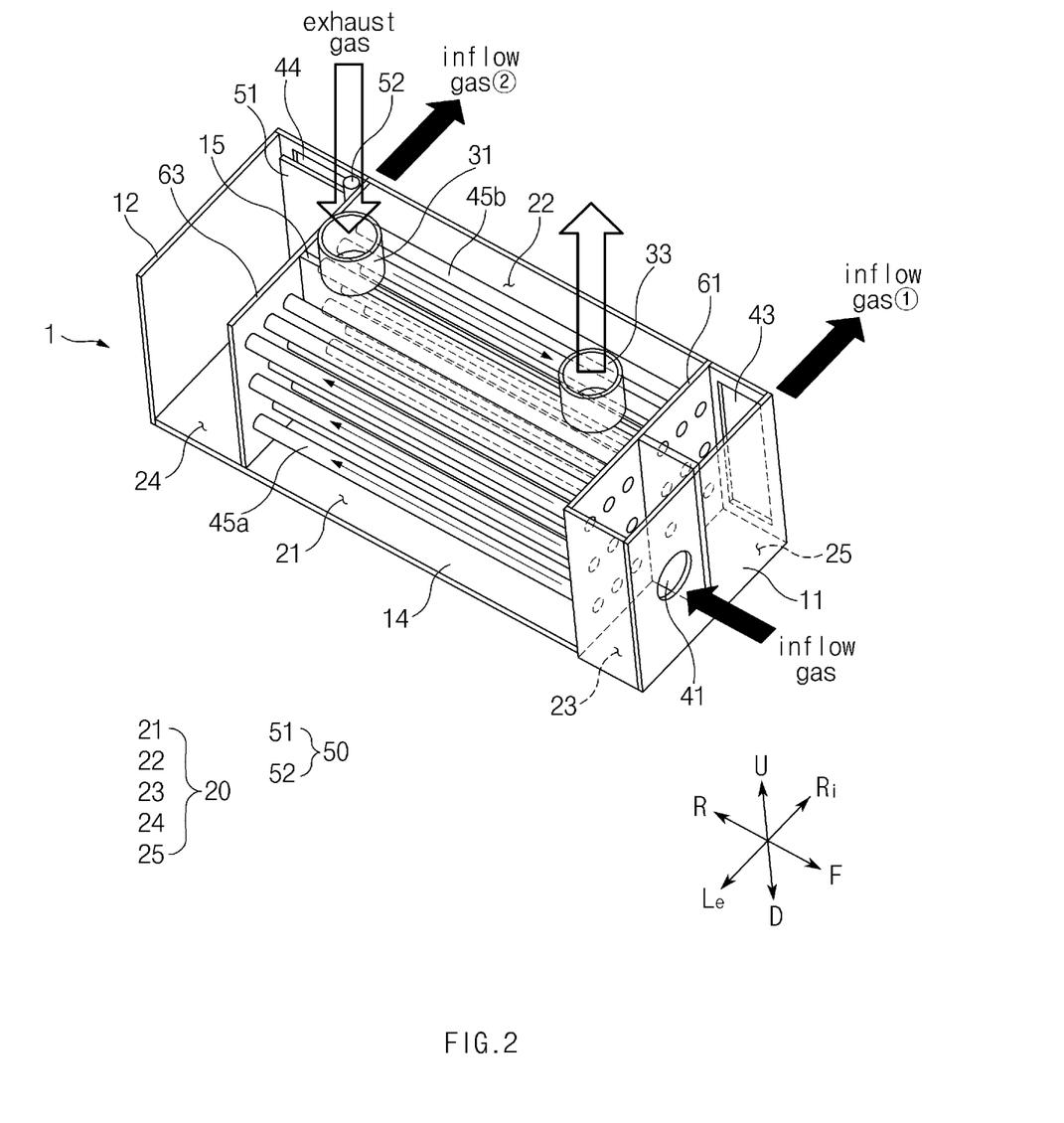
FIG. 2 is a view illustrating the interior of the humidifier of FIG. 1A.

FIG. 1A is a perspective view illustrating a humidifier for a fuel cell according to an embodiment of the present disclosure. FIG. 1B is a block diagram illustrating the gas flow in the humidifier and the fuel cell stack of the present disclosure. FIG. 2 is a view illustrating the interior of the humidifier of FIG. 1A.

In FIG. 2, an upper side surface 13 and part of a left side surface of a body 1 are omitted.

The fuel cell humidifier H according to the embodiment of the present disclosure includes the body 1, an exhaust gas supply part (not shown), and a first valve 50.

The body 1 forms the appearance of the humidifier H and has an inner space 20. The body 1 may have a substantially rectangular parallelepiped shape.

The body 1 may have first and second humidifying spaces 21 and 22 therein, and humidifying membranes 45a and 45b through which inflow gas to be introduced into a fuel cell stack S flows are installed in the first and second humidifying spaces 21 and 22, respectively.

The body 1 may have a passing space 24 into which the inflow gas flows from the first humidifying space 21 and that directly or indirectly connects to the second humidifying space 22 and the fuel cell stack S. The passing space 24 may be defined as a space through which the inflow gas passing through the first humidifying space 21 passes before flowing into the second humidifying space 22.

The exhaust gas supply part may supply exhaust gas into the first and second humidifying spaces 21 and 22. The exhaust gas may be released from the fuel cell stack S and may have higher humidity than the inflow gas.

The first valve 50 may be installed in the passing space 24. The first valve 50 may allow the inflow gas introduced into the passing space 24 to flow into the second humidifying space 22. Alternatively, the first valve 50 may allow the inflow gas introduced into the passing space 24 to flow into the fuel cell stack S except through the second humidifying space 22. In another embodiment, the first valve 50 may allow part of the inflow gas introduced into the passing space 24 to flow into the second humidifying space 22 and the rest of the inflow gas to flow into the fuel cell stack S except through the second humidifying space 22. The flow path of the inflow gas introduced into the body 1 may be changed by the above-configured first valve 50.

In the related art, a fuel cell system includes a humidifier H to increase the humidity of inflow gas to be introduced into a fuel cell stack S. To regulate the amount of added moisture according to the humidity inside the fuel cell stack S, part of the inflow gas flows into the humidifier H, and the reset directly flows into the fuel cell stack S through a bypass passage.

However, the separate bypass passage for regulating the amount of added moisture may make the structure of the fuel cell system complex.

The fuel cell humidifier H according to an embodiment of the present disclosure relates to a humidifying apparatus that is capable of regulating the amount of added moisture and has a simple structure. More specifically, the fuel cell humidifier H, according to the embodiment of the present disclosure, has a basic feature wherein the humidifier H includes the passing space 24 into which the inflow gas flows from the first humidifying space 21 and that directly or indirectly connects to the second humidifying space 22 and the fuel cell stack S. The first valve 50 is installed in the passing space 24 to allow the inflow gas introduced into the passing space 24 to flow into the second humidifying space 22 or the fuel cell stack S except through the second humidifying space 22 or to allow the inflow gas to flow into the second humidifying space 22 and the fuel cell stack S.

The above-configured fuel cell humidifier H according to the embodiment of the present disclosure may change the flow path of at least part of the inflow gas introduced into the humidifier H, thereby regulating the amount of moisture added.

Features of the humidifier H according to the embodiment of the present disclosure will be described below in more detail.

Figure 3:
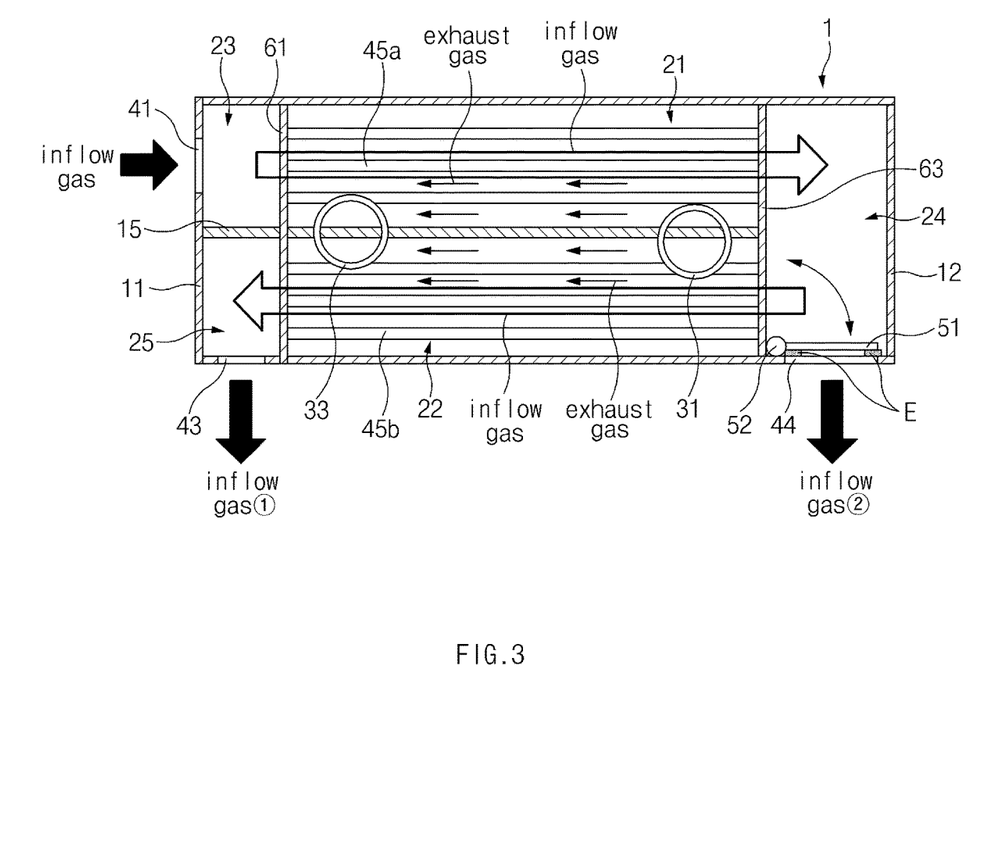
FIG. 3 is a top view illustrating the humidifier of FIG. 2.
Figure 4:
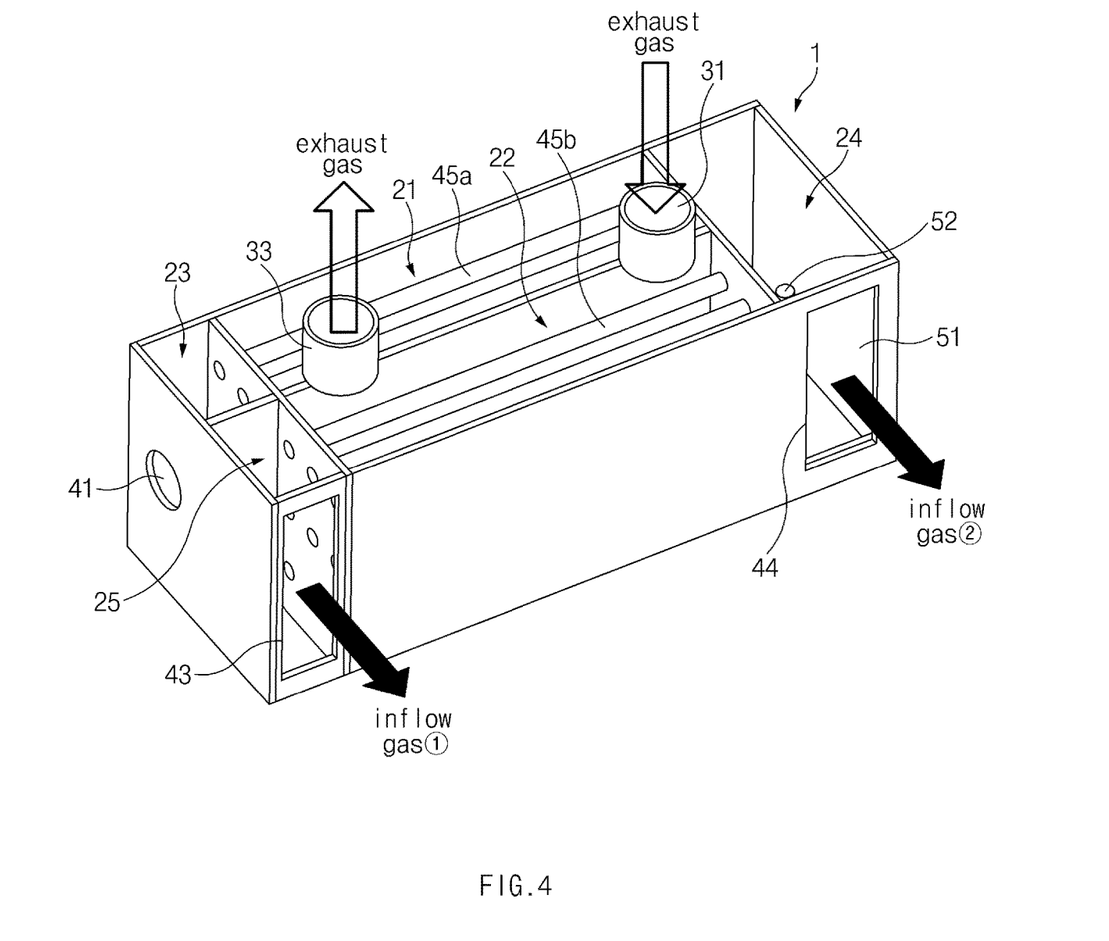
FIG. 4 is a perspective view illustrating the humidifier of FIG. 2 when viewed in a different direction.

FIG. 3 is a top view illustrating the humidifier H of FIG. 2, and FIG. 4 is a perspective view illustrating the humidifier H of FIG. 2 when viewed in a different direction.

In FIGS. 3 and 4, the upper side surface 13 of the body 1 is omitted from the humidifier H.

The body 1 may extend in fore/aft directions and may have the inner space 20 formed therein. The body 1 may have a substantially rectangular parallelepiped shape.

The body 1 may have a central partition wall 15 inside. The inner space 20 of the body 1 may be divided into the first humidifying space 21 and the second humidifying space 22 by the central partition wall 15.

The central partition wall 15 may have a plate-shaped structure that extends in the fore/aft directions in which the body 1 extends. In this embodiment, the central partition wall 15 may extend from a lower side surface 14 to the upper side surface 13 of the body 1 to prevent the first humidifying space 21 and the second humidifying space 22 from being connected.

Referring to FIGS. 2 and 3, the body 1 may have, in a front end portion 11 thereof, an inflow gas inlet 41 through which the inflow gas flows into the body 1 from the outside. The inflow gas flows into an inflow space 23 in the body 1 through the inflow gas inlet 41.

The body 1 may have, in a rear end portion 12 thereof, the passing space 24 into which the inflow gas flows from the first humidifying space 21. The passing space 24 may form a flow passage through which the inflow gas passing through the first humidifying space 21 passes to flow into the second humidifying space 22.

The first and second humidifying spaces 21 and 22 may be arranged parallel to each other with the central partition wall 15 therebetween. In this case, the passing space 24 may be located at the rear end of the first and second humidifying spaces 21 and 22 to connect the first humidifying space 21 and the second humidifying space 22. In other words, the first humidifying space 21 and the second humidifying space 22 may connect through the passing space 24.

The front end portion 11 of the body 1 may be divided by the central partition wall 15 into the inflow space 23 at one side and an exhaust space 25 at the other side.

The inflow gas may flow from the second humidifying space 22 into the exhaust space 25.

The body 1 may have, in the front end portion 11 thereof, a first inflow gas outlet 43 through which the inflow gas is released out of the body 1. The inflow gas, after passing through the second humidifying space 22, may pass through the exhaust space 25 and may be supplied into the fuel cell stack S through the first inflow gas outlet 43.

The body 1 may have, in the rear end portion 12 thereof, a second inflow gas outlet 44 through which the inflow gas is released out of the body 1. The inflow gas introduced into the passing space 24 through the first humidifying space 21 may be supplied into the fuel cell stack S through the second inflow gas outlet 44.

The first valve 50 may be installed in the passing space 24 of the body 1 to adjust the flow path of the inflow gas. The first valve 50 opens or closes the second inflow gas outlet 44 to allow the inflow gas to flow into the fuel cell stack S except through the second humidifying space 22 (when the second inflow gas outlet 44 is opened) or prevent the inflow gas from flowing into the fuel cell stack S except through the second humidifying space 22 (when the second inflow gas outlet 44 is closed). The first valve 50 will be described below in detail.

The exhaust gas supply part may include an exhaust gas inlet 31 and an exhaust gas outlet 33. The exhaust gas inlet 31 may be provided on the upper side surface 13 of the body 1. The exhaust gas outlet 33 may be provided on the upper side surface 13 of the body 1.

In an embodiment, the exhaust gas inlet 31 may be located closer to the rear end portion 12 than the front end portion 11 of the body 1, and the exhaust gas outlet 33 may be located closer to the front end portion 11 than the rear end portion 12 of the body 1. Accordingly, the main flow direction of the exhaust gas in the first and second humidifying spaces 21 and 22 of the body 1 may be formed in the forward direction.

In an embodiment, to cause the exhaust gas to flow into the inner space 20 of the body 1, one end of the exhaust gas inlet 31 may connect to the outside of the body 1, and an opposite end of the exhaust gas inlet 31 may connect to both the first humidifying space 21 and the second humidifying space 22.

In an embodiment, to release the exhaust gas from the inner space 20 of the body 1, one end of the exhaust gas outlet 33 may connect to the outside of the body 1. An opposite end of the exhaust gas outlet 33 may connect to both the first humidifying space 21 and the second humidifying space 22.

Although not illustrated, the exhaust gas supply part may include a regulator for regulating the exhaust gas supplied into the first humidifying space 21 and the second humidifying space 22.

The humidifying membranes 45a and 45b may include the first humidifying membranes 45a installed in the first humidifying space 21 and the second humidifying membranes 45b installed in the second humidifying space 22.

The first humidifying membranes 45a may be installed to traverse the first humidifying space 21 and may cause the inflow gas, which is to be introduced into the fuel cell stack S, to flow through the first humidifying membranes 45a.

The second humidifying membranes 45b may be installed to traverse the second humidifying space 22. The second humidifying membranes 45b may directly or indirectly connect to the first humidifying membranes 45a to cause the inflow gas transferred from the first humidifying membranes 45a to flow through the second humidifying membranes 45b.

The first humidifying membranes 45a and the second humidifying membranes 45b may extend in the fore/aft directions.

The first humidifying membranes 45a and the second humidifying membranes 45b may be implemented with hollow fiber membranes so that gas cannot pass through the humidifying membranes 45a and 45b, but moisture can pass through the humidifying membranes 45a and 45b. The first humidifying membranes 45a and the second humidifying membranes 45b may each include a bundle of hollow fiber membranes.

The humidifier H may include potting parts 61 and 63.

The potting parts 61 and 63 may be installed in the inner space 20 of the body 1 and may pot front and rear ends of the humidifying membranes 45a and 45b in the body 1.

The potting parts 61 and 63 may include the first potting part 61 located toward the front end portion 11 of the body 1 and the second potting part 63 located toward the rear end portion 12 of the body 1.

The first potting part 61 may be formed in the inner space 20 of the body 1 to extend from the lower side surface 14 to the upper side surface 13 of the body 1 and may prevent the exhaust gas from flowing into the inflow space 23 or the exhaust space 25.

The inflow space 23 and the exhaust space 25, through which the inflow gas flows, may be located between the first potting part 61 and the front surface of the body 1. The first potting part 61 restricts the exhaust gas introduced into the first humidifying space 21 and the second humidifying space 22 from flowing into the inflow space 23 and the exhaust space 25. In other words, the first potting part 61 blocks the flow of the exhaust gas, which is introduced into the first humidifying space 21 and the second humidifying space 22, toward the inflow space 23 or the exhaust space 25.

The second potting part 63 may be formed in the inner space 20 of the body 1 to extend from the lower side surface 14 to the upper side surface 13 of the body 1 and may prevent the exhaust gas from flowing into the passing space 24.

The passing space 24, through which the inflow gas flows, may be located between the second potting part 63 and the rear surface of the body 1. The second potting part 63 restricts the exhaust gas introduced into the first humidifying space 21 and the second humidifying space 22 from flowing into the passing space 24. In other words, the second potting part 63 blocks the flow of the exhaust gas, which is introduced into the first humidifying space 21 and the second humidifying space 22, toward the passing space 24.

The first valve 50 may include a first valve plate 51 hingedly installed in the passing space 24. The first valve 50 may include a valve actuator (not illustrated) for operating the first valve plate 51. For example, the valve actuator may include an electric motor for rotating a first valve shaft 52. The electric motor may rotate the first valve plate 51 in one direction and an opposite direction under the control of a controller (not illustrated).

Referring to FIG. 3, the first valve plate 51 may be movable between a first position and a second position. The first valve plate 51 may rotate about the first valve shaft 52.

The first position may be defined as a position where the first valve plate 51 allows the inflow gas introduced into the passing space 24 to flow into the second humidifying space 22. The first position may be defined as a position where the first valve plate 51 allows the flow of the inflow gas into the second humidifying space 22, but does not allow the inflow gas to flow into the fuel cell stack S except through the second humidifying space 22.

The second position may be defined as a position where the first valve plate 51 allows the inflow gas to flow into the fuel cell stack S except through the second humidifying space 22. The second position may be defined as a position where the first valve plate 51 allows the flow of the inflow gas into the fuel cell stack S except through the second humidifying space 22, but does not allow the inflow gas to flow into the second humidifying space 22.

In an embodiment, the humidifier H may further include an elastic member (E in FIG. 3) for increasing air tightness when the first valve plate 51 is located in the first or second position.

The elastic member E may be provided on the first valve plate 51 or the body 1 to increase air tightness between the first valve plate 51 and the second inflow gas outlet 44 when the first valve plate 51 is located in the first position.

The elastic member E may be provided on the first valve plate 51 or the potting part 63 to increase air tightness between the first valve plate 51 and the inlets of the second humidifying membranes 45b when the first valve plate 51 is located in the second position.

The flow path of the inflow gas depending on the position of the first valve 50 will be described with reference to FIGS. 2 to 4.

First, when the first valve 50 is located in the first position, the second inflow gas outlet 44 is closed so that the inflow gas is allowed to flow into the second humidifying space 22, but not allowed to flow into the fuel cell stack S except through the second humidifying space 22.

Specifically, the inflow gas flows into the inflow space 23 through the inflow gas inlet 41, flows from the inflow space 23 into the first humidifying membranes 45a, and passes through the first humidifying space 21 while flowing through the first humidifying membranes 45a. While passing through the first humidifying space 21, the inflow gas is humidified by moisture supplied from the exhaust gas through the first humidifying membranes 45a. The inflow gas introduced into the passing space 24 through the first humidifying space 21 flows into the second humidifying membranes 45b. The inflow gas passes through the second humidifying space 22 while flowing through the second humidifying membranes 45b. While passing through the second humidifying space 22, the inflow gas is additionally humidified by moisture supplied from the exhaust gas through the second humidifying membranes 45b. The inflow gas introduced into the exhaust space 25 through the second humidifying space 22 is supplied into the fuel cell stack S through the first inflow gas outlet 43.

Next, when the first valve 50 is located in the second position, the second inflow gas outlet 44 is opened so that the inflow gas is allowed to flow into the fuel cell stack S except through the second humidifying space 22. In this case, the first valve 50 may completely block the inlets of the second humidifying membranes 45b to prevent the flow of the inflow gas into the second humidifying space 22.

Specifically, the inflow gas flows into the inflow space 23 through the inflow gas inlet 41, flows from the inflow space 23 into the first humidifying membranes 45a, and passes through the first humidifying space 21 while flowing through the first humidifying membranes 45a. While passing through the first humidifying space 21, the inflow gas is humidified by moisture supplied from the exhaust gas through the first humidifying membranes 45a. The inflow gas introduced into the passing space 24 through the first humidifying space 21 is supplied into the fuel cell stack S through the second inflow gas outlet 44. In other words, the inflow gas is directly supplied into the fuel cell stack S except through the second humidifying space 22.

When the first valve 50 is located between the first position and the second position, the second inflow gas outlet 44 is opened so that the inflow gas is allowed to flow into the second humidifying space 22 and the fuel cell stack S except through the second humidifying space 22.

In this example, the ratio of the inflow gas flowing into the second humidifying space 22 to the inflow gas flowing into the fuel cell stack S except through the second humidifying space 22 may be determined based on the position of the first valve 50.

For example, when the first valve 50 is located closer to the first position than the second position, the amount of inflow gas flowing into the second humidifying space 22 may be greater than the amount of inflow gas flowing into the fuel cell stack S except through the second humidifying space 22.

In another example, when the first valve 50 is located closer to the second position than the first position, the amount of inflow gas flowing into the fuel cell stack S except through the second humidifying space 22 may be greater than the amount of inflow gas flowing into the second humidifying space 22.

When the first valve 50 is located closer to the first position than the second position, the inflow gas flowing into the fuel cell stack S may have higher humidify than when the first valve 50 is located closer to the second position than the first position. The reason is that with an increase in the amount of inflow gas flowing into the second humidifying space 22, the inflow gas contains more moisture.

The above-configured humidifier H according to the embodiment of the present disclosure may regulate the amount of added moisture by changing the flow path of the inflow gas in the humidifier H with the first valve 50 included therein. In other words, the humidifier H may regulate the amount of added moisture by changing the total length of the flow path of the inflow gas in the humidifier H (in particular, the length of the section where the humidification is performed).

Furthermore, the humidifier H according to the embodiment of the present disclosure may more finely regulate the amount of added moisture by adjusting the position of the first valve 50. In other words, the humidifier H may adjust the position of the first valve 50 between the first position and the second position to allow part of the inflow gas to pass through the second humidifying space 22 and the rest of the inflow gas to flow into the fuel cell stack S except through the second humidifying space 22, thereby regulating the moisture content in the entire inflow gas to be introduced into the fuel cell stack S.

The humidifier H according to the embodiment of the present disclosure may be configured such that the humidification performance of the first humidifying space 21 is different from that of the second humidifying space 22.

In the humidifier H according to the embodiment of the present disclosure, the inflow gas introduced into the humidifier H necessarily passes through the first humidifying space 21, but may or may not pass through the second humidifying space 22. In other words, the inflow gas firstly obtains moisture while passing through at least the first humidifying space 21 and is thereafter supplied into the fuel cell stack S.

The humidifier H according to the embodiment of the present disclosure may be configured such that the humidification performance of the first humidifying space 21 is relatively lower than that of the second humidifying space 22. Therefore, the humidifier H may reduce the minimum amount of moisture added to the inflow gas. When the fuel cell stack S requires inflow gas with relatively low humidity, the humidifier H may supply humidified inflow gas appropriate for the case to the fuel cell stack S.

Furthermore, when the fuel cell stack S requires inflow gas with relatively high humidity, the humidifier H may supply appropriately humidified inflow gas to the fuel cell stack S by using the second humidifying space 22 that has higher humidification performance than the first humidifying space 21.

Hereinafter, specific examples for making the humidification performance of the first humidifying space 21 lower than that of the second humidifying space 22 are described.

In an embodiment, the exhaust gas supply part may supply more exhaust gas to the second humidifying space 22 than the first humidifying space 21. For example, the exhaust gas inlet 31 and the exhaust gas outlet 33 may be formed such that an opening area toward the second humidifying space 22 is larger than an opening area toward the first humidifying space 21. Accordingly, more moisture may be transferred from the exhaust gas to the inflow gas in the second humidifying space 22 than in the first humidifying space 21.

In an embodiment, in the first humidifying space 21, the flow direction of the inflow gas flowing through the first humidifying membranes 45a may correspond to the overall flow direction of the exhaust gas. In the second humidifying space 22, the flow direction of the inflow gas flowing through the second humidifying membranes 45b may be opposite to the overall flow direction of the exhaust gas.

Referring to FIG. 3, the first and second humidifying spaces 21 and 22 may be arranged parallel to each other with the central partition wall 15 therebetween and may connect through the passing space 24 in the rear end portion 12 of the body 1. Therefore, the inflow gas flows in a first direction in the first humidifying space 21 and flows in the opposite direction to the first direction in the second humidifying space 22.

Referring to FIG. 3, in this embodiment, the exhaust gas inlet 31 is located close to the rear end of the body 1, and the exhaust gas outlet 33 is located close to the front end of the body 1. As a result, the exhaust gas flows from back to front in the first and second humidifying spaces 21 and 22. In contrast, the exhaust gas inlet 31 may be located close to the front end of the body 1 and the exhaust gas outlet 33 may be located close to the rear end of the body 1, such that the exhaust gas flows from front to back in the first and second humidifying spaces 21 and 22.

Accordingly, in the first humidifying space 21, the flow direction of the inflow gas flowing through the first humidifying membranes 45a may correspond to the overall flow direction of the exhaust gas. In the second humidifying space 22, the flow direction of the inflow gas flowing through the second humidifying membranes 45b may be opposite to the overall flow direction of the exhaust gas.

In this example, moisture may be more easily exchanged between the exhaust gas and the inflow gas in the first humidifying space 21 than in the second humidifying space 22. In other words, even though the same amount of exhaust gas flows into the first humidifying space 21 and the second humidifying space 22, the humidification effect in the first humidifying space 21 may be greater than that in the second humidifying space 22.

In an embodiment, the second humidifying membranes 45b installed in the second humidifying space 22 may have a higher moisture permeability than the first humidifying membranes 45a installed in the first humidifying space 21.

In an embodiment, the first humidifying membranes 45a may include a plurality of hollow fiber membranes, and the second humidifying membranes 45b may include a plurality of hollow fiber membranes. The number of hollow fiber membranes installed in the first humidifying space 21 may be smaller than the number of hollow fiber membranes installed in the second humidifying space 22.

Figure 5:
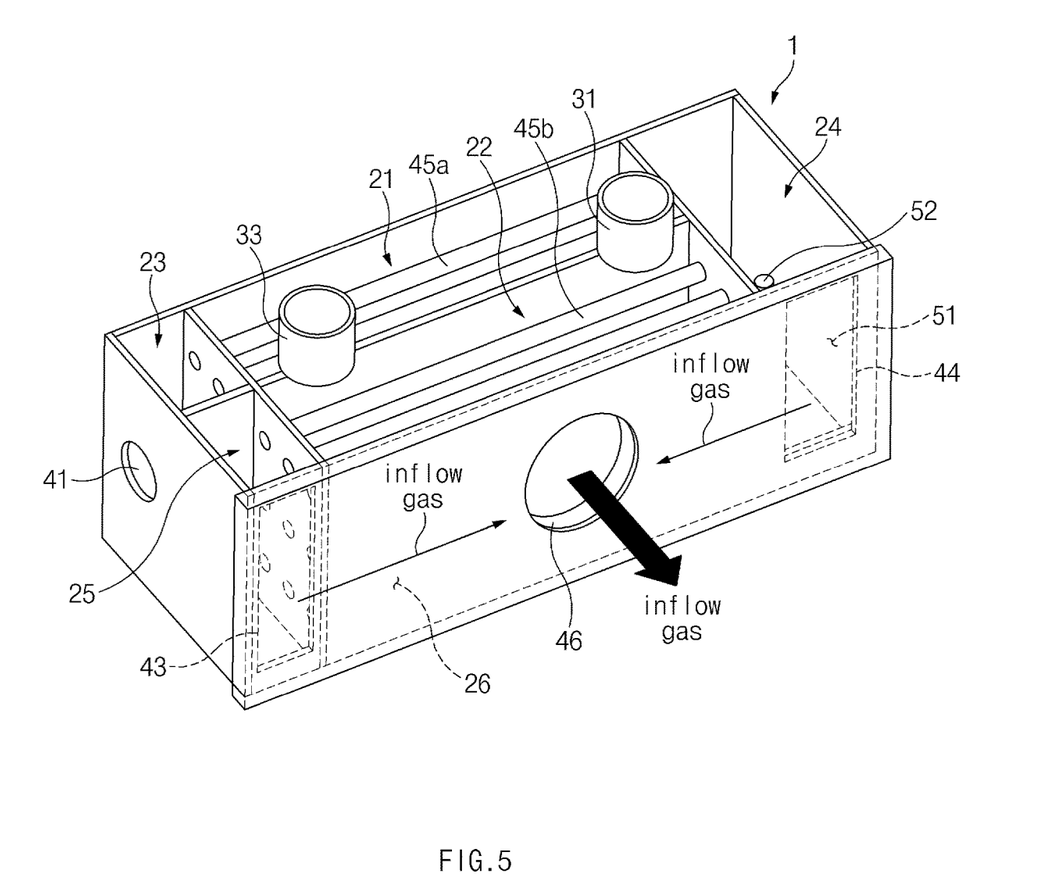
FIG. 5 is a perspective view illustrating a humidifier for a fuel cell according to another embodiment of the present disclosure.

FIG. 5 is a perspective view illustrating a humidifier H for a fuel cell according to another embodiment of the present disclosure. In FIG. 5, the upper side surface of the body 1 is omitted.

Referring to FIG. 5, the humidifier H may further include, inside the body 1, a first communicating space 26 into which inflow gas to be introduced into the fuel cell stack S except through the second humidifying space 22 and inflow gas to be introduced into the fuel cell stack S through the second humidifying space 22, are introduced.

The first communicating space 26 may be formed by a partition wall that divides the inner space 20 of the body 1. The first communicating space 26 may extend at one side of the body 1 in the direction in which the first and second humidifying spaces 21 and 22 extend. In other words, the first communicating space 26 may be formed parallel to the second humidifying space 22 with the partition wall therebetween.

The body 1 may include a third inflow gas outlet 46 that is open at the one side of the body 1 to release the inflow gas introduced into the first communicating space 26 toward the fuel cell stack S.

The third inflow gas outlet 46 may have a cross-sectional area that is equal to the entire cross-sectional area of the flow passage through which the inflow gas flows from the passing space 24 into the second humidifying space 22. In other words, the cross-sectional area of the third inflow gas outlet 46 may be equal to the sum of the cross-sectional areas of the entire flow passages of the second humidifying membranes 45b.

Accordingly, the differential pressure of the inflow gas may remain constant when the inflow gas introduced into the passing space 24 flows into the second humidifying space 22 through the second humidifying membranes 45b, with the first valve 50 located in the first position. When the inflow gas flows from the passing space 24 into the second humidifying space 22, the pressure of the inflow gas falls due to resistance caused by the shape of the flow passage. When the inflow gas passing through the second humidifying space 22 flows into the first communicating space 26 through the exhaust space 25, the inflow gas may be released toward the fuel cell stack S through the third inflow gas outlet 46. At this time, the pressure of the inflow gas is changed if the cross-sectional area of the third inflow gas outlet 46 is larger or smaller than the sum of the cross-sectional areas of the entire flow passages of the second humidifying membranes 45b.

Therefore, even though the humidifier H further includes the first communicating space 26, the cross-sectional area of the third inflow gas outlet 46 may be equal to the entire cross-sectional area of the flow passage through which the inflow gas flows from the passing space 24 into the second humidifying space 22, so as to uniformly maintain the differential pressure applied to the inflow gas passing through the humidifier H, as compared with the case where the humidifier H does not include the first communicating space 26.

Figure 6:
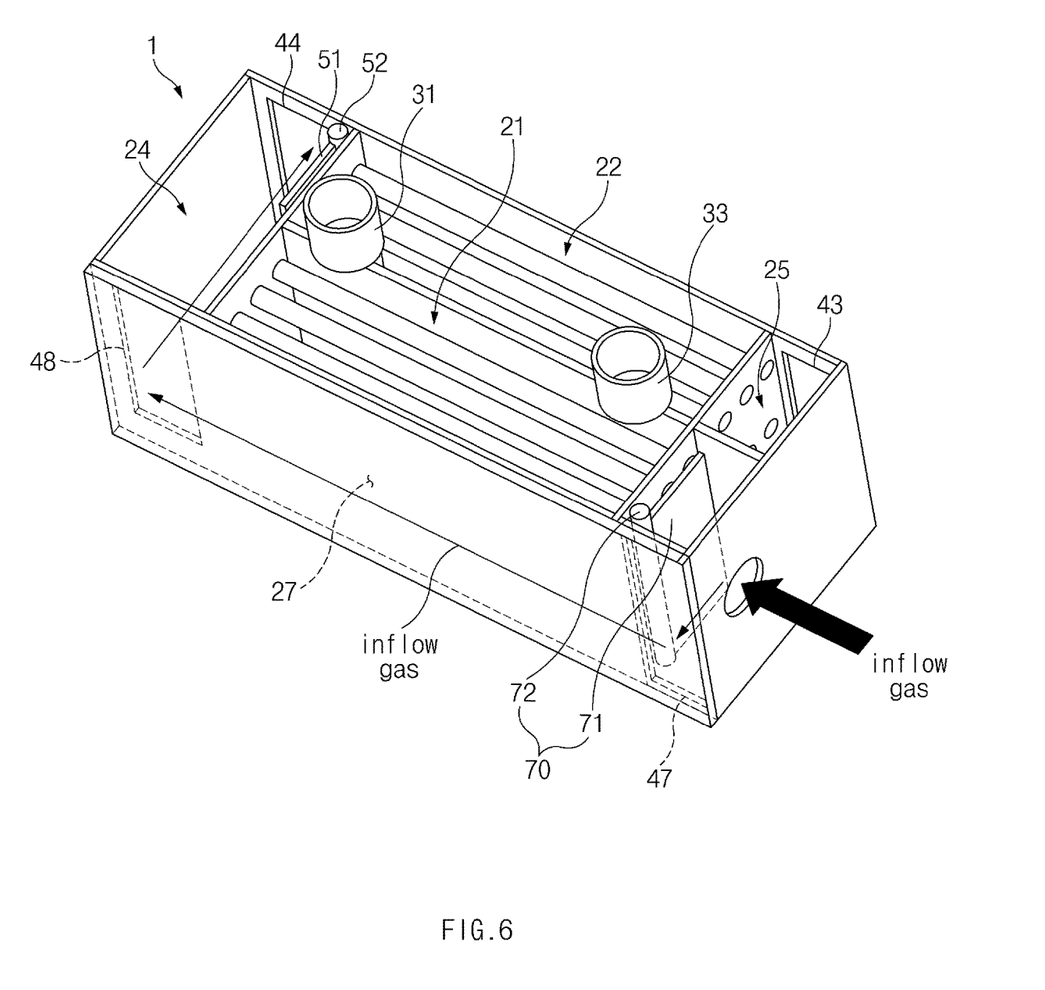
FIG. 6 is a perspective view illustrating a humidifier for a fuel cell according to yet another embodiment of the present disclosure.

FIG. 6 is a perspective view illustrating a humidifier H for a fuel cell according to yet another embodiment of the present disclosure. In FIG. 6, the upper side surface of the body 1 is omitted.

Referring to FIG. 6, the body 1 may include a second communicating space 27 for guiding inflow gas introduced into the body 1 toward the passing space 24 except through the first humidifying space 21. The second communicating space 27 may be formed inside the body 1. The second communicating space 27 may be formed by a partition wall that divides the inner space 20 of the body 1.

The second communicating space 27 may extend in the direction in which the first and second humidifying spaces 21 and 22 extend. The second communicating space 27 may be formed parallel to the first humidifying space 21 with the partition wall therebetween.

The second communicating space 27 may connect the inflow space 23, into which the inflow gas is introduced from the outside of the humidifier H, and the passing space 24. Accordingly, the inflow gas introduced into the inflow space 23 of the humidifier H may flow into the passing space 24 via the second communicating space 27 except through the first humidifying space 21.

The inflow gas may flow from the inflow space 23 into the second communicating space 27 through a second communicating space inlet 47. The inflow gas may be released from the second communicating space 27 into the passing space 24 through a second communicating space outlet 48.

The humidifier H may further include a second valve 70 for regulating the flow of the inflow gas from the inflow space 23 into the second communicating space 27.

The second valve 70 may allow the inflow gas introduced into the body 1 to flow into the first humidifying space 21. The second valve 70 may allow the inflow gas introduced into the body 1 to flow into the second communicating space 27. The second valve 70 may allow the inflow gas introduced into the body 1 to flow into the first humidifying space 21 and the second communicating space 27.

A second valve plate 71 may be movable between a third position and a fourth position. The second valve plate 71 may rotate about a second valve shaft 72.

The second valve 70 may include a valve actuator (not illustrated) for operating the second valve plate 71. For example, the valve actuator may include an electric motor for rotating the second valve shaft 72. The electric motor may rotate the second valve plate 71 in one direction and an opposite direction under the control of a controller (not illustrated).

The second valve plate 71 may be rotatable between the third position and the fourth position.

The third position may be defined as a position where the second valve plate 71 allows the inflow gas introduced into the inflow space 23 to flow into the first humidifying space 21. The third position may be defined as a position where the second valve plate 71 allows the flow of the inflow gas into the first humidifying space 21, but does not allow the inflow gas to flow into the second communicating space 27.

The fourth position may be defined as a position where the second valve plate 71 allows the inflow gas introduced into the inflow space 23 to flow into the second communicating space 27. The fourth position may be defined as a position where the second valve plate 71 allows the flow of the inflow gas into the second communicating space 27, but does not allow the inflow gas to flow into the first humidifying space 21.

In an embodiment, the humidifier H may further include an elastic member (not illustrated) for increasing air tightness when the second valve plate 71 is located in the third or fourth position.

In an embodiment, when the second valve 70 is located in the fourth position, the first valve 50 may be located in the second position. At this time, the inflow gas introduced into the body 1 may flow into the passing space 24 through the second communicating space 27 and may flow from the passing space 24 into the fuel cell stack S. In other words, when the second valve 70 is located in the fourth position to allow all of the inflow gas introduced into the body 1 to flow into the second communicating space 27, the first valve 50 may be located in the second position to allow the inflow gas introduced into the passing space 24 to flow into the fuel cell stack S except through the second humidifying space 22.

Accordingly, there may be obtained the same effect as forming a bypass passage in a fuel cell system including a humidifier H in the related art to allow inflow gas to directly flow into a fuel cell stack S except through the humidifier H.

In the related art, to supply humidified or non-humidified inflow gas into a fuel cell stack S according to necessity, a structure is considered that includes a flow passage for guiding inflow gas released from an air supply member (e.g., a configuration including an air compressor) toward a humidifier H and a bypass passage for guiding the inflow gas released from the air supply member toward the fuel cell stack S except through the humidifier H.

In this case, the configuration of the fuel cell system may be complex and the entire volume thereof may be large since the bypass passage has to be configured separately from the humidifier H and a valve has to be additionally included to regulate the flow of the inflow gas into a flow passage connected with the bypass passage and the humidifier H.

According to this embodiment, the humidifier H includes the second communicating space 27 and the valves 50 and 70 for regulating the flow of the inflow gas into the second communicating space 27 and the first and second humidifying spaces 21 and 22, and therefore the configuration of the fuel cell system may be simplified.

Furthermore, the humidification performance of the humidifier H may be adjusted in a wider range by appropriately controlling the first valve 50 and the second valve 70 together. For example, all of the inflow gas introduced into the humidifier H may be allowed to flow into the fuel cell stack S except through the first and second humidifying spaces 21 and 22. As a result, the inflow gas may not be humidified. In another example, at least part of the inflow gas introduced into the humidifier H may be humidified while passing through the first humidifying space 21, the second humidifying space 22, or the first and second humidifying spaces 21 and 22.

According to the embodiments of the present disclosure, at least the following effects are achieved.

First, the humidifier H includes the passing space into which the inflow gas flows from the first humidifying space and that directly or indirectly connects to the second humidifying space and the fuel cell stack S and the first valve installed in the passing space to allow the inflow gas introduced into the passing space to flow into the second humidifying space or the fuel cell stack S except through the second humidifying space or allow the inflow gas to flow into the second humidifying space and the fuel cell stack S, thereby appropriately regulating the amount of added moisture according to various operating conditions of the fuel cell stack S.

Second, due to the above-described structure, the humidifier H may regulate the amount of added moisture by itself and may have a compact structure as compared with a conventional one.

Effects of the present disclosure are not limited to the aforementioned effects. Any other effects not mentioned herein will be clearly understood from the accompanying claims by those of ordinary skill in the art to which the present disclosure pertains.

Hereinabove, although the present disclosure has been described with reference to various embodiments and the accompanying drawings, the present disclosure is not limited thereto, but may be variously modified and altered by those of ordinary skill in the art to which the present disclosure pertains without departing from the spirit and scope of the present disclosure claimed in the following claims.

What is claimed is:

1. A humidifier for a fuel cell, the humidifier comprising:
a body;
first and second humidifying spaces formed inside the body, wherein humidifying membranes through which inflow gas flows to be introduced into a fuel cell stack are installed in the first and second humidifying spaces;
an exhaust gas inlet and an exhaust gas outlet disposed at the body and configured to supply exhaust gas released from the fuel cell stack to the first and second humidifying spaces, the exhaust gas having higher humidity than the inflow gas;
a passing space formed inside the body and directly or indirectly communicated with the second humidifying space and the fuel cell stack, wherein the inflow gas flows into the passing space from the first humidifying space; and
a first valve installed in the passing space to allow the inflow gas introduced into the passing space to flow into the fuel cell stack passing through the second humidifying space or into the fuel cell stack without passing through the second humidifying space, or to allow some of the inflow gas introduced into the passing space to flow into the fuel cell stack passing through the second humidifying space and others of the inflow gas introduced into the fuel cell stack without passing through the second humidifying space,
wherein a flow path, in which the inflow gas introduced into the body flows into the fuel cell stack without passing through the second humidifying space, is configured to be selected by controlling the first valve.

2. The humidifier of claim 1, wherein the first valve includes a first valve plate hingedly installed in the passing space, and
wherein the first valve plate is movable between a first position where the first valve plate allows the inflow gas introduced into the passing space to flow into the second humidifying space and a second position where the first valve plate allows the inflow gas introduced into the passing space to flow into the fuel cell stack except through the second humidifying space.

3. The humidifier of claim 2, further comprising:
an elastic member configured to increase air tightness when the first valve plate is located in the first or second position.

4. The humidifier of claim 1, further comprising:
a first communicating space formed inside the body, wherein the inflow gas not passing through the second humidifying space and/or the inflow gas passing through the second humidifying space flows into the first communicating space,
wherein the body includes a first inflow gas outlet that is open at one side of the body and through which the inflow gases introduced into the first communicating space are released toward the fuel cell stack.

5. The humidifier of claim 4, wherein a cross-sectional area of the first inflow gas outlet is substantially equal to an entire cross-sectional area of a flow passage through which the inflow gas flows from the passing space into the second humidifying space.

6. The humidifier of claim 1, wherein the first and second humidifying spaces are arranged parallel to each other with a partition wall therebetween such that the inflow gas flows in a first direction in the first humidifying space and flows in an opposite direction to the first direction in the second humidifying space.

7. The humidifier of claim 6, wherein:
the exhaust gas inlet has one end communicated with the outside of the body and an opposite end communicated with the first and second humidifying spaces to cause the exhaust gas to flow into the body; and
the exhaust gas outlet has one end communicated with the first and second humidifying spaces and an opposite end communicated with the outside of the body to release the exhaust gas out of the body.

8. The humidifier of claim 1, wherein the exhaust gas supply inlet and the exhaust gas outlet are configured to supply more exhaust gas to the second humidifying space than the first humidifying space.

9. The humidifier of claim 1, wherein the humidifying membrane installed in the second humidifying space has a higher moisture permeability than the humidifying membrane installed in the first humidifying space.

10. The humidifier of claim 1, wherein the humidifying membrane installed in the first humidifying space includes a plurality of hollow fiber membranes,
   wherein the humidifying membrane installed in the second humidifying space includes a plurality of hollow fiber membranes, and
   wherein the number of hollow fiber membranes installed in the first humidifying space is smaller than the number of hollow fiber membranes installed in the second humidifying space.

11. The humidifier of claim 1, further comprising:
   a second communicating space formed inside the body to guide the inflow gas introduced into the body toward the passing space without passing through the first humidifying space; and
   a second valve configured to allow the inflow gas introduced into the body to flow into the first humidifying space or the second humidifying space or allow some of the inflow gas introduced into the body to flow into the first humidifying space and others of the inflow gas introduced into the body to flow into the second humidifying space.

12. The humidifier of claim 11, wherein the first valve is positioned to cause all of the inflow gas introduced into the passing space to flow into the fuel cell stack without passing through the second humidifying space when the second valve is positioned to cause all of the inflow gas introduced into the body to flow into the second communicating space.

* * * * *